Feb. 13, 1962   W. D. CELMER ET AL   3,021,259
ANTIBIOTICS PA-1033A AND PA-1033B
Filed June 19, 1958
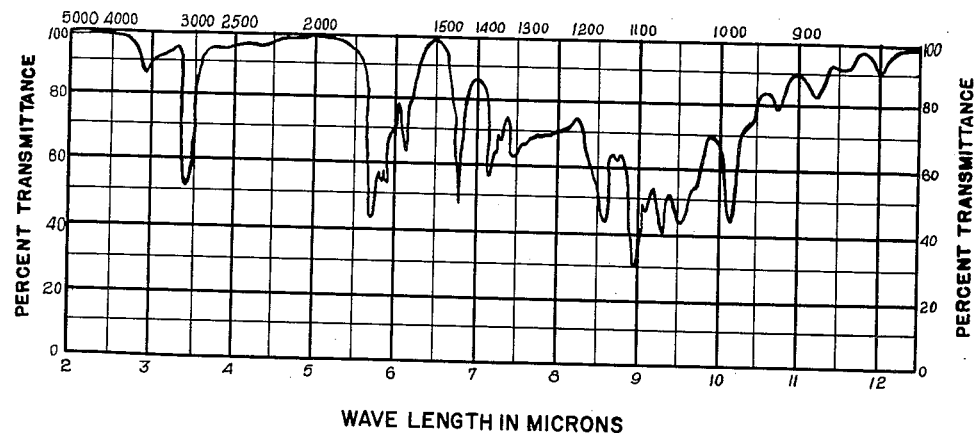
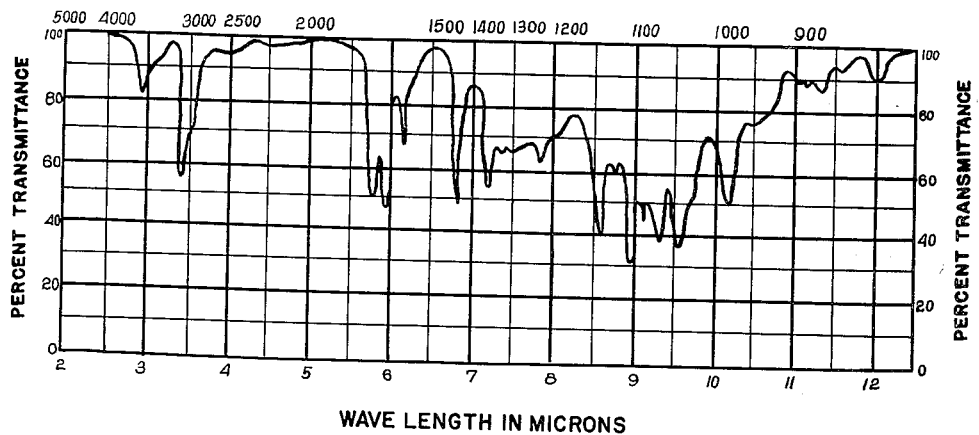
INVENTORS,
WALTER D. CELMER
KOTARO MURAI
JOHN B. ROUTIEN
BEN A. SOBIN
BY, *Connolly and Hutz*
ATTORNEYS

United States Patent Office 3,021,259
Patented Feb. 13, 1962

3,021,259
ANTIBIOTICS PA-1033A AND PA-1033B
Walter D. Celmer, Garden City, and Kotaro Murai, Hicksville, N.Y., John B. Routien, Tenafly, N.J., and Ben A. Sobin, Manhasset, N.Y., assignors to Chas. Pfizer & Co., Inc., Brooklyn, N.Y., a corporation of Delaware
Filed June 19, 1958, Ser. No. 743,182
4 Claims. (Cl. 167—65)

This invention is concerned with new and useful antimicrobial agents and with fermentation processes for their production. These new antibiotics are known as PA1033A and PA1033B. Moreover, this invention relates to a process for the production of these antibiotics by fermentation, the methods for their recovery and concentration from crude solutions including the fermentation broths, methods for their purification, and to these antibiotics in pure crystalline form. This invention includes within its scope the antibiotics, PA1033A and PA1033B as crude concentrates and in purified forms. These novel products are especially useful in combatting microorganisms which are plant pathogens.

The products, PA1033A and PA1033B are formed during the cultivation under controlled conditions of a new strain, isolated from the soil, of a new species of microorganism known as *Streptomyces griseofaciens* Tanner and Routien which is identified by planting the testing cultures thereof on media normally used for the identification of such microorganisms and by observing the growth and/or changes which occur incident thereto. This new strain closely resembles *Streptomyces griseofaciens* described in copending application, Serial No. 743,183 filed concurrently herewith. However, it differs from this organism in that it produces a grayish tan soluble pigment in milk and in having yellowish-white aerial mycelium on starch plates. A living culture of this new strain has been deposited with the American Type Culture Collection in Washington, D.C., and added to its collection of microorganisms as ATCC No. 13180. The cultural characteristics of this new strain if *S. griseofaciens* are set forth in the following table. The cultural characteristics were recorded after two weeks of incubation at 28° C. on the media specified.

TABLE 1

| Medium | Amount of Growth | Growth and color of Aerial Mycelium | Color of Spores | Soluble Pigment | Remarks |
|---|---|---|---|---|---|
| Pridham's Yeast Extract Agar. | Excellent | Excellent; white to pale gray. | white to pale gray. | Lacking | Vegetative mycelium not visible; spores borne in long straight or slightly wavy chains; formed singly or in pairs; spores rarely oval to mostly cylindrical, 0.65–1.00 x 1.00–1.40μ; formed by segmentation. |
| Skimmed Milk | Poor | Lacking | None | Grayish-tan | Vegetative mycelium colorless to cream to pale yellow; milk coagulated moderately peptonized. |
| Glucose Agar | Moderate | do | do | do | Vegetative mycelium grayish tan; growth finely convoluted at base of slant; reverse grayish-tan. |
| Nutrient Agar | Moderate | do | do | Yellowish | Vegetative mycelium shiny, smooth, grayish-tan; reverse grayish. |
| Synthetic Agar | Poor to Moderate. | Sparse; gray-white. | do | Lacking | Vegetative mycelium colorless; reverse cream; pin point type of growth. |
| Calcium Malate Agar. | Moderate | Good; gray-white | do | do | Vegetative mycelium colorless; reverse cream color; pinpoint type of growth; malate digested. |
| Cellulose | do | Moderate white | do | do | |
| Potato Plugs | Moderate to Good. | Very sparse; grayish white. | do | Olive-Gray | Vegetative mycelium olive-gray to yellowish olive; reverse olive-gray. |
| Starch Plates | Moderate | Sparse; yellowish White. | do | Lacking | Vegetative mycelium pale yellow; zone of hydrolysis 2.5 cm. in diameter. |
| Gelatin Plates | Moderate to Good. | Lacking | do | Dark Yellowish Brown. | Vegetative mycelium yellowish-olive; very slight liquefaction. |
| Dextrose-Nitrate Broth. | Moderate | Sparse; grayish white. | do | Yellowish | Vegetative mycelium grayish-white; reduction of nitrates to nitrites completed and proceeded to free nitrogen or ammonia. |
| Glucose-Asparagine Plates. | do | Sparse; white | do | Lacking | Vegetative mycelium colorless to cream to pale yellow; growth raised and convoluted; reverse cream to pale yellow. |

It is to be understood that the present invention embraces the use not only of the organism of the above description which is given merely for illustrative purposes, but it also embraces the use of mutants produced from the described organism by means such as X-ray irradiation, ultraviolet irradiation, treatment with nitrogen mustards, and the like. It is further to be understood that the invention includes the use of subcultures obtained by various standard microbiological techniques, such as the single colony and single spore isolation methods. Such mutants and/or subcultures may differ in certain respects from the above described new strain. It also includes use of organisms of this strain isolated from other sources.

PA1033A and PA1033B have considerable activity against Gram-positive organisms, especially against microorganisms that are phytopathogens. They are particularly active against *Phytomonas tumefaciens* which is responsible for crown gall. Crown gall is representative of a group of diseases in which the major infection on the host is hyperplasia and hypertrophy. Crown gall affects preferably fruits, for example, apple, peach, apricot, plums, grape, and the like. Crown gall usually consists of overgrowths varying gradually in size. Such galls occur normally on the subterranean roots of fruit trees and shrubs and may also appear on the grown stems or leaves of woody and herbaceous plants. The infections of the hosts usually result in the withering of leaves and fruits. The utility of the new antibiotics in human therapy has not as yet been demonstrated.

PA1033A and PA1033B and mixtures thereof have been found most effective in inhibiting the growth of *Phytomonas tumefaciens*. In vitro tests were carried out to determine the minimum inhibitory concentration of PA1033A and PA1033B against *P. tumefaciens*. The tests were carried out by the serial dilution technique. According to this technique, nutrient media were prepared containing the antibiotics PA1033A and PA1033B at a concentration of 100 mcg./ml. Aliquots of these media were next diluted with varied volumes of the inoculum so that the tubes containing PA1033A and PA1033B at a concentration of 100, 50, 25, 12.5, 6.25, 3.12, 1.56, 0.78, 0.39, 0.19 mcg./ml. were obtained. These tubes were then incubated with the test organism, i.e. *P. tumefaciens* to determine the extent to which the microorganism grows in the presence of these antibacterial agents. In this fashion, the minimum inhibitory concentration of the antibiotics was found to be 200 mcg./ml. for each antibiotic.

Table 2 illustrates the activity of PA1033A and PA1033B as well as a mixture of about equal parts of both antibiotics against a group of microorganisms which cause various diseases. A number of these organisms are resistant to other known antimicrobial agents. The tests were carried out by the procedure described above. In each case, there is indicated the minimum inhibitory concentration (MIC) of the antibiotic or mixture against the designated microorganism expressed in micrograms per milliliter.

TABLE 2

|  | PA 1033A and B | PA 1033A | PA 1033B |
| --- | --- | --- | --- |
| Streptococcus pyogenes | 1.56 | 3.12 | 0.19 |
| Streptococcus faecalis | 3.12 | 3.12 | 6.25 |
| Diplococcus pneumonial | 1.56 | 1.56 | 0.39 |
| Erysipelothrix rhusiopathial | 6.25 | 6.25 | 6.25 |
| Listeria monocytogenes | 6.25 | 6.25 | 6.25 |
| Bacillus subtilis | 3.12 | 6.25 | 6.25 |
| Bacterium ammoniogenes | 3.12 | 1.56 | 6.25 |
| Lactobacillus caesi | 1.56 | 1.56 | 3.12 |

ANTIBIOTIC RESISTANT *MICROCOCCUS PYOGENES* VAR. *AUREUS* STRAINS

|  |  |  |  |
| --- | --- | --- | --- |
| 376 | 3.12 | 3.12 | 6.25 |
| Penicillin/r | 3.12 | 3.12 | 12.5 |
| M¹ | 6.25 | 6.25 | 6.25 |
| M² | 6.25 | 3.12 | 6.25 |
| 400 | 6.25 | 6.25 | 12.5 |
| 93/r | 25 | 25 | 50 |
| Terramycin/r | 6.25 | 6.25 | 6.25 |

This invention also includes processes for producing these new compounds by growing the new strain of *S. griseofaciens*. The microorganism may be cultivated at temperatures ranging from about 23° C. to about 32° C. However, it is preferred to use temperatures of from about 26° C. to 30° C. The organism is best grown under submerged conditions of agitation and aeration on media containing a carbohydrate source such as sugars, starch and glycerol, an organic nitrogen source such as soy bean meal, cotton seed meal, peanut meal, and corn-steep liquor and mineral salts such as sodium chloride, sodium nitrate, magnesium sulfate, and potassium phosphate. In addition to these, a buffering agent such as calcium carbonate or potassium dihydrogen phosphate, and a foam preventer such as vegetable oils or animal oils may be used. The preferred pH range is from about 6 to 7. When the medium is adjusted to this point before fermentation, there is little change during the course of production of the antibiotics. During the fermentation the broths are agitated with stirrers of suitable design for incorporating air into the broth. Aeration at the rate of about ½ to 2 volumes of air per volume of broth per minute produces satisfactory results. About 1 to 3 days are required for the fermentation broths to reach maximum antibiotic potency.

Inoculum for the production of PA1033A and PA1033B may be obtained by growth from slants or Roux bottles inoculated with *S. griseofaciens* ATCC 13180. Suitable solid media for this initial growth are beef-lactose or Emerson's agar. This growth is used to inoculate either flasks or inoculum tanks. The time required to reach maximum growth will vary somewhat, but in general from about ½ to 3 days are sufficient. When inoculum tanks are used, the final broth containing a large amount of mycelium is used to inoculate the large fermenters. Of course, aseptic technique is used throughout to avoid contamination of the batch by undesired organisms.

The progress of antibiotic production is conveniently followed during fermentation by biological assay of the broth employing *B. subtilis*. Standard plate assay technique is employed in which the zone of inhibition surrounding a filter paper disc saturated with the broth is used as a measure of antibiotic potency. After the fermentation broth has reached a suitable antibiotic potency, the mycelium is filtered, ordinarily without pH adjustment. A diatomaceous aid such as Super-Cel greatly facilitates the filtration. Various types of equipment may be employed, for instance, filter presses, centrifuges, etc. The filtered broth may be used as such, or it may be spray dried to give a product which is useful for local application on plants or animals or in animal feeds. However, it is preferred to purify the material to some extent before using it therapeutically.

Paper chromatography is convenient for analyzing the composition of crude materials which contain PA1033A and PA1033B. A number of solvent systems have been used for the analysis of crude preparations or broths by paper chromatography. One such procedure employs Whatman No. 4 filter paper, saturated with a 50% solution of formamide in methanol as the stationary phase, and a 1:1 solvent mixture of benzene and cyclohexane saturated with formamide as the mobile phase. This system gave Rf values of 0.75 and 0.20 for PA1033A and PA1033B respectively. Employing benzene in place of the benzene-cyclohexane mixture gave Rf values of 0.75 and 0.24 for PA1033A and PA1033B respectively.

In connection with paper chromatography as a criterion of homogeneity of the isolated antibiotics, bioautographic detection of antibiotic activity by means of agar plates seeded with *B. subtilis* is also employed. The antibiotics isolated by paper chromatography satisfied the bioautographic requirement for proof of homogeneity.

The antibiotic products are recovered from the fermentation broths by a number of different procedures including solvent extraction and column chromatography or combination thereof. Various organic solvents are useful in extracting PA1033A and PA1033B from the filtered broth. Particularly effective solvents are ethyl acetate, methyl acetate, and methyl isobutylketone. Solvent extraction is preferably carried out using a volume of solvent approximately equal to the volume of broth from which it is desired to recover the antibiotics. It is often convenient to use two extractions, each with the volume of solvent being about ½ the volume of the broth. Various equipment such as separatory funnels, stirred tanks, and mechanical extracting devices such as centrifugal separators are helpful during the extractions.

One such procedure which is satisfactory for obtaining an amorphous solid concentrate of the antibiotics PA1033A and PA1033B involves solvent extraction of the filtered broth with ethyl acetate, concentration, preferably under reduced pressure of the extract to ⅙₀ or 1/100 of the original volume, and precipitation of the product from the concentrate with several volumes of a non-solvent such such as petroleum ether. The cream-colored solid so obtained represents most of the antibiotic activity due to PA1033A and PA1033B and corresponds to about 200 mg./l. of broth. Purified products are obtainable from such concentrates, either the solvent concentrate or the precipitated amorphous solid, by column chromatography on acid-washed alumina.

The preferred method of recovery for PA1033A and PA1033B is as follows. The filtered broth is extracted by shaking it with an equal volume of ethyl acetate. The extract is concentrated under reduced pressure to remove almost all the solvent, and the residue is then subjected to countercurrent distribution between benzene, cyclohexane, 95% ethanol and water in a 5:5:8:2 ratio by volume. PA1033A and PA1033B follow the organic phase. Distribution coefficients of the antibiotics are 1.5 and 0.5 respectively in the above described solvent system.

The phases are separated and solutions evaporated. The separated PA1033A and PA1033B are recovered as solid residue.

As mentioned above the novel antibiotics of this invention are useful in combating *P. tumefaciens*. These antibacterial agents may be applied to the infected hosts in a variety of forms, for example, in suitable extending media, liquid or solid, which are well known in the art. For example, solutions or suspensions of the antibiotics in suitable solvents may be employed to introduce the agents into the host by root absorption. Alternatively, solid compositions containing the antibiotics in a solid extending agent, such as fuller's earth, various types of clay, peat moss and the like, may be advantageously applied to the roots of the host by conventional means. Solutions or suspensions of the antibiotics may be applied directly to the seat of infection, i.e. the gall, by conventional means. Treatment may be continued for as long as is required to combat the phytopathogen. The time required of course will vary with the host, the extent of infection and so forth.

The following examples are given by way of illustration and are not to be construed as limitations of this invention many variations of which are possible within the scope and spirit thereof.

*Example I*

A sterile, aqueous medium having the following composition was prepared:

| | Percent |
|---|---|
| Glycerol | 3.0 |
| Peanut meal | 2.0 |
| Ammonium sulfate | 0.25 |
| Sodium chloride | 0.4 |
| Molasses (crude beet) | 0.15 |
| Calcium carbonate | 0.5 |

A slant culture of *S. griseofaciens* ATCC13180 was transferred to 100 ml. of this medium in a 300 ml. Erlenmyer flask and shaken 48 hours until good growth was obtained. Inoculum for a larger fermentation was prepared by transferring the contents of this aforesaid flask under sterile conditions to one liter of the same medium in a 3 liter flask and shaking the same for 48 hours.

Fifty gallons of sterile nutrient medium having the above described compositions was prepared and then inoculated with the inoculum thus prepared. The temperature was maintained at 28° C. and the broth was stirred and aerated at the rate of 1 volume of air per volume of broth per minute. After 48 hours, the broth was filtered and adjusted to pH 7.7. The broth was then extracted twice with one quarter volume of ethyl acetate. The combined solvent phases were concentrated to about one tenth volume under vacuum. The antibiotics were then extracted into water adjusted to pH 2 with sulfuric acid. The aqueous phase was separated, adjusted to pH 7 and extracted with ether several times. The ether solution, after drying over anhydrous sodium sulfate, was distilled to obtain the crude antibiotics as residues.

The crude antibiotics were separated and purified by Craig countercurrent procedure in a solvent system composed (by volume) of benzene (5), cyclohexane (5), 95% ethanol (8) and water (2). The distribution coefficients of the antibiotics PA1033A and PA1033B in this solvent system are 1.50 and 0.50 respectively. The two antibiotics were obtained in about equal amount from the crude preparation.

Antibiotic PA1033A melts at 87.2–88.0° C. and, on analysis, gives the following average proportions:

| | |
|---|---|
| Carbon | 64.5 |
| Hydrogen | 9.52 |
| Nitrogen | 3.04 |
| Oxygen (by difference) | 23.0 |

PA1033A is a weakly basic compound. Titration in 50% ethanol gave a neutral equivalent of 465. The empirical formula calculates to $C_{25}H_{43}NO_6$.

PA1033A is optically active, having a rotation of $[\alpha]_D^{25} = +39.6°$ (c. 0.5 methanol). Its ultraviolet absorption maxima have $$E_{1\,cm.}^{1\%}\ 183$$

(226 m$\mu$) and 9.0 (275 m$\mu$) in chloroform and when dissolved in chloroform exhibits characteristics absorption in the infrared region at the following frequencies expressed in reciprocal centimeters: 3401, 2933, 2899, 2833, 2755, 1742, 1706, 1689, 1664, 1623, 1468, 1389, 1362, 1333, 1163, 1112, 1095, 1072, 1045, 985, 930, 890, 862, 835. The infrared spectra of PA1033A and PA1033B are illustrated in the attached drawing.

Antibiotic PA1033B melts at 99.8–101° C. and on analysis, gives the following average proportions:

| | |
|---|---|
| Carbon | 51.2 |
| Hydrogen | 8.86 |
| Nitrogen | 2.50 |
| Oxygen (by difference) | 31.5 |

PA1033B is a weakly basic compound. Titration in 50% ethanol gave a neutral equivalent of 527. The empirical formula calculates to $C_{25}H_{45}NO_{10}$.

PA1033B is optically active, having a rotation of $[\alpha]_D^{25} = +22.5°$ (c. 0.5, methanol). Its ultraviolet absorption maximum has $$E_{1\,cm.}^{1\%}$$

(223 m$\mu$) in chloroform and when dissolved in chloroform exhibits characteristic absorption in the infrared region at the following frequencies expressed in reciprocal centimeters: 3436, 2907, 2857, 2778, 1739, 1695, 1642, 1629, 1605, 1468, 1389, 1364, 1342, 1279, 1163, 1143, 1115, 1096, 1075, 1046, 1031, 981, 955, 889, 835, 865.

Both antibiotics form salts with organic and inorganic acids such as phosphoric, nitric, sulfuric, hydrochloric, tartaric, glycollic, citric, gluconic, malic, maleic, succinic, glutaric, acetic and benzoic acids. The respective hydrochloride is precipitated from an ether solution of the antibiotic by the addition of alcoholic hydrogen chloride. The salts of PA1033A and PA1033B possess antimicrobial activity.

What is claimed is:

1. A process for producing the antibiotic substances PA1033A and PA1033B which process comprises cultivating the microorganism *S. griseofaciens* ATCC13180 in an aqueous nutrient medium containing a source of carbohydrate, a source of organic nitrogen and inorganic salts, under submerged aerobic conditions until substantial antimicrobial activity is imparted to said medium.

2. A process as in claim 1 wherein the antibiotic substances are recovered from the fermentation broth.

3. A substance selected from the group consisting of PA1033A, a basic compound having the molecular weight 465 and the molecular formula $C_{25}H_{43}NO_6$, which in crystalline form has a melting point of about 87.2 to 88° C. and an optical rotation of $[\alpha]_D^{25} = +39.6$ at a concentration of 0.5% in methanol, absorption maxima in the ultraviolet region of the spectrum at 226 mµ and 275 mµ with $$E_{1\,cm.}^{1\%}$$

values of 183 and 9, respectively, in chloroform and having the average composition by weight of 64.5% carbon, 9.52% hydrogen, 3.04% nitrogen and 23.0% oxygen (by difference) and when dissolved in chlorofrom exhibits characteristic absorption in the infrared region at the following frequencies expressed in reciprocal centimeters: 3401, 2933, 2899, 2833, 2755, 1742, 1706, 1689, 1664, 1623, 1468, 1389, 1362, 1333, 1163, 1112, 1095, 1072, 1045, 985, 930, 890, 862, 835, and the acid salts of said basic substance.

4. A substance selected from the group consisting of PA133B, a basic compound having the molecular weight 527 and the molecular formula $C_{25}H_{45}NO_{10}$, which in crystalline form has a melting point of about 99.8 to 101° C. and an optical rotation of $[\alpha]_D^{25} = +22.5$ at a concentration of 0.5% in methanol, absorption maxima in the ultraviolet region of the spectrum at 223 mµ with $$E_{1\,cm.}^{1\%}$$

value of 184 in chloroform and the average composition by weight of 57.2% carbon, 8.86 hydrogen, 2.50 nitrogen, 31.5% oxygen (by difference) and when dissolved in chloroform exhibits characteristic absorption in the infrared region at the following frequencies expressed in reciprocal centimeters: 3436, 2907, 2857, 2778, 1739, 1695, 1642, 1629, 1605, 1468, 1389, 1364, 1342, 1279, 1163, 1143, 1115, 1096, 1075, 1046, 1031, 981, 955, 889, 835, 865 and the acid salts of said basic substance.

References Cited in the file of this patent

Bergey's Manual of Determinative Bacteriology, 7th ed., pp. 788–789, entry No. 80, Williams and Wilkins Co., Baltimore, 1957.

Waksman: Bacteriological Reviews, 21:1, pp. 1–29, Mar. 1, 1957.

Raper et al.: Articles in N. Y. Academy of Sciences, Art. 60, No. 1, Oct. 29, 1954, pp. 5 and 24.

Sneath: J. Gen. Microbiol., August 1952, pp. 184–200.